US008430951B2

(12) United States Patent  
McKinney

(10) Patent No.: US 8,430,951 B2  
(45) Date of Patent: Apr. 30, 2013

(54) LOW COST FLUID FLOW SENSOR

(75) Inventor: Peter J. McKinney, Boulder, CO (US)

(73) Assignee: Strionair, Inc., Louisville, CO (US)

( * ) Notice: Subject to any disclaimer, the term of this patent is extended or adjusted under 35 U.S.C. 154(b) by 1226 days.

(21) Appl. No.: 11/964,637

(22) Filed: Dec. 26, 2007

(65) Prior Publication Data

US 2008/0184769 A1    Aug. 7, 2008

Related U.S. Application Data

(60) Provisional application No. 60/882,085, filed on Dec. 27, 2006.

(51) Int. Cl.  
B01D 49/00 (2006.01)

(52) U.S. Cl.  
USPC ..................................... 96/420; 96/18; 96/19

(58) Field of Classification Search .................... 96/420, 96/18, 19; 73/1.16, 204.25, 204.26, 204.13–204.14  
See application file for complete search history.

(56) References Cited

U.S. PATENT DOCUMENTS 4,566,342 A * 1/1986 Kurz .......................... 73/863.03  
4,854,167 A   8/1989 Czarnocki  
5,623,097 A   4/1997 Horiguchi  
2002/0077759 A1 * 6/2002 Cohen et al. ..................... 702/50  
2002/0100316 A1 * 8/2002 James et al. ................ 73/204.26  
2004/0074387 A1   4/2004 Jaisinghani  
2004/0237643 A1 * 12/2004 Nikolaus ..................... 73/204.14

FOREIGN PATENT DOCUMENTS

WO   PCT/US2007/88897   12/2007

* cited by examiner

Primary Examiner — Jason M. Greene  
Assistant Examiner — Karla Hawkins  
(74) Attorney, Agent, or Firm — Miller, Mattias & Hull LLP

(57) ABSTRACT

A system and method for a low cost fluid flow sensor is described. One embodiment includes a fluid flow sensor comprising a first resistance temperature detector configured for generating a flow signal, wherein the flow signal is based on a fluid velocity, and wherein the first resistance temperature detector is configured for a fluid temperature range; a second resistance temperature detector configured for generating a temperature signal, wherein the temperature signal is based on a fluid temperature; and a controller coupled to the first resistance temperature detector and the second resistance temperature detector, the controller configured for receiving the flow signal and the temperature signal, wherein the controller takes a first controller action when the temperature signal is within a temperature signal range substantially representative of the fluid temperature range, and the flow signal is within a flow signal range, wherein the flow signal range is determined based on the temperature signal.

13 Claims, 6 Drawing Sheets

LOW COST FLUID FLOW SENSOR

PRIORITY

The present application claims priority to commonly owned and assigned application Ser. No. 60/882,085, entitled "Dual-Filter Electrically Enhanced Air Filtration System, Low-Cost Air Flow Sensor, and Ionization Detector for Air Cleaner," filed on Dec. 27, 2006, which is incorporated herein by reference in its entirety.

RELATED APPLICATIONS

The present application is related to commonly owned and assigned application Ser. No. 11/771,978, entitled "Dual-filter Electrically Enhanced Air Filtration System," and application no. {filed concurrently herewith}, entitled "Ionization Detector for Electrically Enhanced Air Filtration Systems", both of which are incorporated herein by reference.

FIELD OF THE INVENTION

The present invention relates to low cost fluid flow sensors. In particular, but not by way of limitation, the present invention relates to systems and methods for low cost air flow sensors for use in air filtration systems in environments with a wide range of operating temperatures.

BACKGROUND OF THE INVENTION

Air filtration is used in a wide variety of environments such as automobiles, homes, office buildings, and manufacturing facilities. In many cases, filtration systems are used to remove pollutants such as dust, particulates, microorganisms, and toxins from breathing air, although filtration systems and processes may be used to purify manufacturing environments, process gasses, combustion gasses, and the like.

One particular application of air filtration is in heating, ventilation, and air conditioning (hereinafter "HVAC") systems within buildings. HVAC systems comprise a motor and blower that moves air from a supply through ductwork that distributes the air throughout the building spaces. The air supply may be outside air, recirculated air from inside the building, or a mixture of outside and recirculated air. In these kinds of HVAC systems, air-filtration systems are placed in-line with the ductwork to filter out particulates and organisms that are present within the flow of air.

Another common application of air filtration is in standalone room air-filtration systems. Such a system, which may be portable, is placed in a room to purify the air in an area surrounding the air-filtration system.

Though there are several types of air-filtration technologies such as mechanical filters, frictional electrostatic filters and electret filters, active electrically enhanced air-filtration systems have become increasingly popular because of their high efficiency. One particular type of electrically enhanced filter includes an upstream screen through which air enters the filter, a pre-charging unit downstream from the upstream screen and upstream from the filter medium, an upstream electrode between the pre-charging unit and the upstream side of the filter medium, and a downstream electrode that is in contact with the downstream side of the filter medium. A high-voltage electric field is applied between the pre-charging unit and the downstream electrode.

Such a filter captures particles via three mechanisms. First, the filter medium physically collects particles in the same manner as a mechanical filter. Second, the high-voltage electric field polarizes particles in the air flow and portions of the filter medium itself, causing the polarized particles to be attracted to polarized portions of the filter medium. Third, the pre-charging unit creates a space-charge region made up of ions within the electric field. The ions cause particles passing through the space-charge region to become electrically charged, and the charged particles are attracted to portions of the polarized filter medium having opposite charge.

Though electrically enhanced filters such as that just described are capable of performing high-efficiency air filtration, there is a need for less expensive and improved controls to monitor and ensure proper operation. For example, in some applications a flow sensor is required in order to control filter operation during periods of little or no air flow. This is needed in order to reduce the power use of the filter system, to improve the useful life of the system, and to prevent any harmful effects that may result from running an electronic filter in a no flow condition. Similarly, other types of air cleaners, such as standard electronic air cleaners or small electrostatic precipitators, could also benefit from operational control as a function of airflow.

In addition, equipment downstream of the filtration system, such as the flow detector itself, a fan or a heat exchanger, may be damaged or otherwise negatively impacted if ions are allowed to precipitate downstream. If the system is allowed to operate without a filter properly in place, or with a damaged filter in place, free ions will collect on downstream equipment. In other situations, it may be desirable to test the ion production in various portions of the electrically enhanced air-filtration system in order to better control operation settings. It is thus apparent that there is a need in the art for an improved sensor apparatus and method for controlling electrically enhanced air-filtration systems.

Although present devices are functional, they are not sufficiently accurate or otherwise satisfactory. Accordingly, a system and method are needed to address the shortfalls of present technology and to provide other new and innovative features.

SUMMARY OF THE INVENTION

Exemplary embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

The present invention can provide a system and method for sensing an air flow within an operating temperature range. In one exemplary embodiment, the present invention can include a fluid flow sensor comprising a first resistance temperature detector configured for generating a flow signal, wherein the flow signal is based on a fluid velocity, and wherein the first resistance temperature detector is configured for a fluid temperature range; a second resistance temperature detector configured for generating a temperature signal, wherein the temperature signal is based on a fluid temperature; and a controller coupled to the first resistance temperature detector and the second resistance temperature detector, the controller configured for receiving the flow signal and the temperature signal, wherein the controller takes a first controller action when the temperature signal is within a temperature signal range substantially representative of the fluid temperature range, and the flow signal is within a flow signal range, wherein the flow signal range is determined based on the temperature signal.

In another embodiment, the present invention can include A method for controlling a component of a fluid flow system, the method comprising the steps of receiving a flow signal from a fluid velocity sensor, wherein the fluid velocity sensor is located at least partially within a fluid flow system; receiving a temperature signal from a fluid temperature sensor, wherein the fluid temperature sensor is located at least partially within the fluid flow system; determining if the temperature signal is within a pre-determined temperature signal range; taking a control action based on the flow signal and the temperature signal; controlling a component of the fluid flow system using the control action.

As previously stated, the above-described embodiments and implementations are for illustration purposes only. Numerous other embodiments, implementations, and details of the invention are easily recognized by those of skill in the art from the following descriptions and claims.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings wherein:

DETAILED DESCRIPTION

Figure 1:
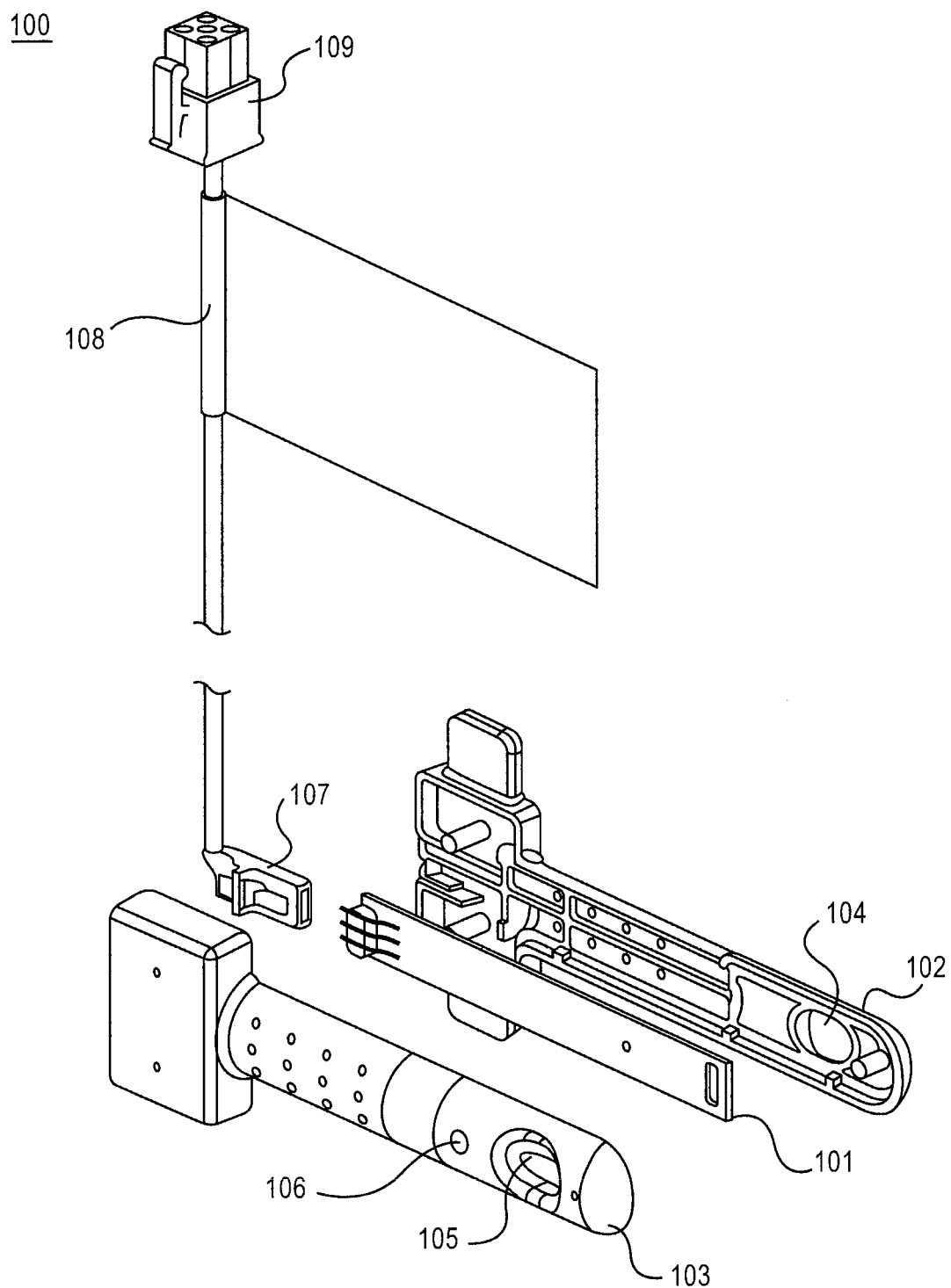
FIG. 1 is a system diagram illustrating one embodiment of a flow sensor.

Referring now to the drawings, where like or similar elements are designated with identical reference numerals throughout the several views, and referring in particular to FIG. 1, it illustrates one embodiment of a flow sensor. Flow sensor 100 may be used in numerous applications where the measurement of a fluid flow is desirable. In the present embodiment, the invention is discussed for use where the fluid is air. This is exemplary only. Those skilled in the art will be aware of uses and modifications for various fluid flows including liquid flows and gas flows. The present embodiments discuss the use of the present invention in the air for discussion only. While certain modifications may have to be made in order to operate in different fluids, those modifications fall within the present invention and are covered by the claims.

In traditional operating environments, a flow sensor may be required to operate accurately over a wide range of temperatures. In order to allow the use of inexpensive components that may vary in accuracy over many temperatures, the flow sensor 100 may be expected to be calibrated over these temperature ranges. In one embodiment, the flow sensor 100 may further include an ambient air temperature sensor used to ignore airflow detection at extreme high or low temperatures.

Further, the flow sensor 100 may be used to detect the presence of airflow and thus report a "flow is on" condition over a smaller range of temperatures. By limiting the accuracy requirements of the flow sensor 100 to a pre-determine temperature range, calibration of the flow sensor 100 remains inexpensive. By limiting the temperature range over which the flow sensor 100 is calibrated, a single-point calibration may be all that is necessary. Turning off the flow sensor 100 and eliminating a "flow is on" condition at extreme temperatures, provides safe operation of the sensor by reducing or eliminating false flow readings that may be detected at the limits of the calibration temperature range. Thus, flow readings at the temperature extremes, whether correct or false, will not be detected and reported.

Returning to FIG. 1, the flow sensor 100 includes a sensor circuit board 101. The circuit board 101 may comprise circuitry for the actual flow sensor (not shown), an ambient temperature sensor (not shown) and an ion sensor (not shown). Details of the sensor circuit board 101 are further described in FIGS. 2 and 3. In one embodiment, the sensor circuit board 101 may be enclosed by a top flow sensor housing 102 and a bottom flow sensor housing 103. The two housings may be pressed together to provide a shell to protect the circuit board 101 from damage. Further, the top flow sensor housing 102 may have a small opening 104 positioned to expose the flow sensor circuit to the outside air. Bottom flow sensor housing 103 may also have a small opening 105 serving the same purpose. In another embodiment, a pin hole opening 106 may also expose an ion sensor to the outside air. For example, an ion sensor (not shown) may be positioned in the pinhole opening 106, permitting the ion sensor to detect an ionization level in the airflow. In one embodiment, the ionization level may could be an amount of ions, measured by the number of ions detected in a certain time period. In another embodiment, the ionization level may be an amount of ions measured by the number of ions detected for a given air flow.

In yet another embodiment the sensor 100 may only contain an ionization detector 100. In this embodiment, the ionization detector could comprise an ion collection area (not shown) exposed to the airflow through an opening. In the embodiment shown in FIG. 1, the ionization detector is exposed to the airflow using a pin hole opening 106. The ion collection area could be connected to circuit board 101 so as to be able to detect the ionization level in the airflow. The ionization detector 100 may be used alone, or in conjunction with the flow sensor 100.

In order to provide power to the flow sensor 100 and/or ionization detector 100, the sensor circuit board 101 may be configured to accept a power connector 107 at one end of a power wire 108. At the opposite end of the power wire 108 is a power supply connector 109 which may connect either directly or indirectly to a power supply (not shown).

Figure 2:
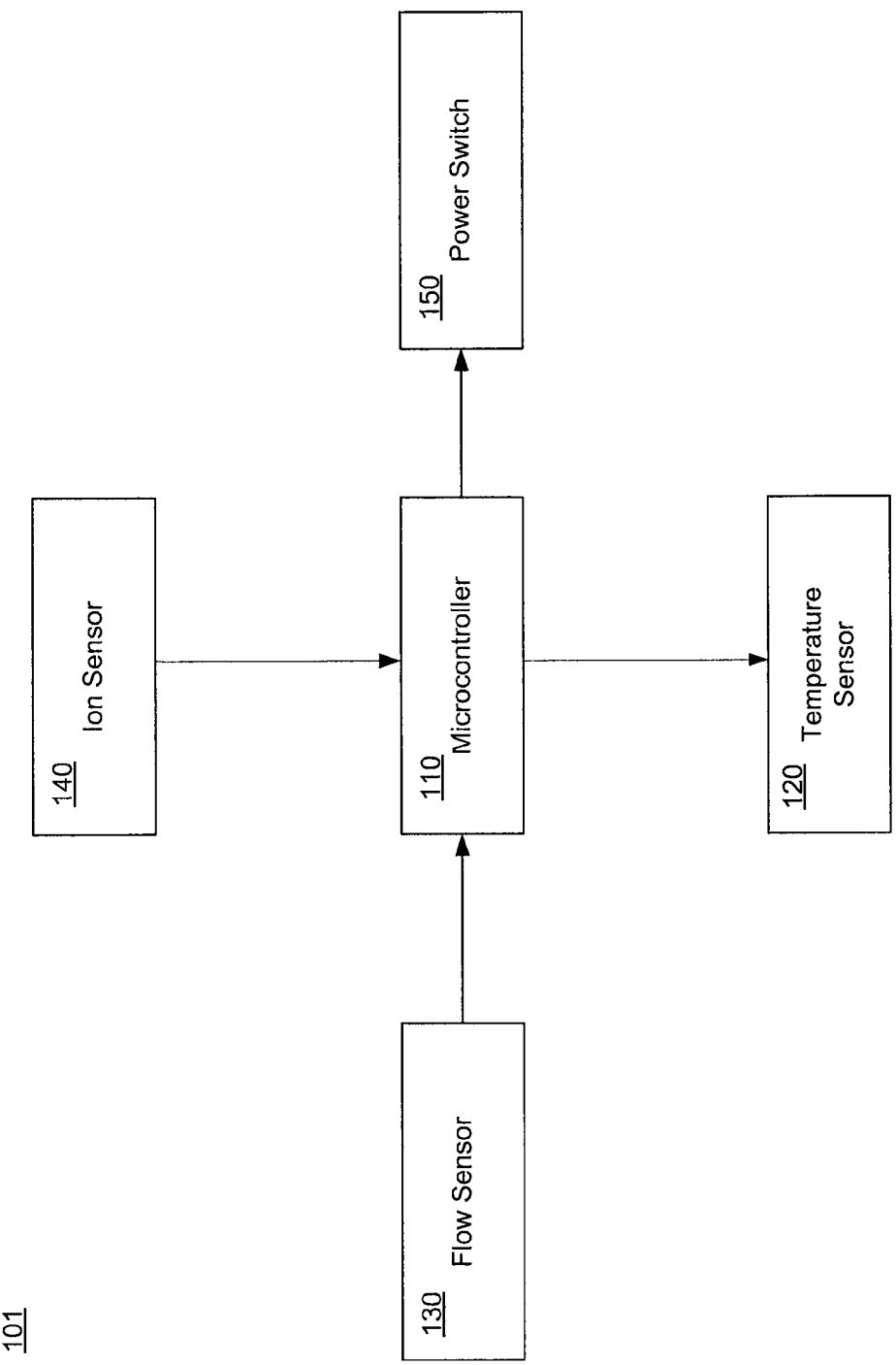
FIG. 2 is a system diagram illustrating one embodiment of the function modules of a flow sensor circuit.

FIG. 2 is a system diagram illustrating an embodiment of the functional modules of the sensor circuit board 101. A central module of the sensor circuit board 101 is a microcontroller 110. The microcontroller 110 receives signals from multiple sources and determines whether the apparatus utilizing the flow sensor 100 should remain on or off. The circuit board 101 further includes a temperature sensor module 120. The temperature sensor module 120 may sense the ambient air temperature and report a signal based on the temperature to the microcontroller 110. In one embodiment, the temperature sensor module 120 transmits a signal representative of the current ambient air temperature to the microcontroller 110 at pre-determined time intervals.

The use of a microcontroller 110 is exemplary only and not intended to limit the present invention. In another embodiment, the microcontroller 110 could be replaced with analog circuit controller consistent with the present invention. For example, a logical analog controller design could be used to only pass signals at certain circuitry thresholds. In yet another embodiment, an analog controller may be designed to choose one of two binary states based on temperature and velocity. Those skilled in the art will be aware of numerous modifications and alternatives that can be used consistent with the present invention.

The sensor circuit board 101 further includes a flow sensor module 130. The flow sensor module 130 may transmit a signal to the microcontroller 110. The microcontroller 110 could then calculate the airflow based on the signal received from the flow sensor module 130 and based on the temperature reported by the temperature sensor module 120. By calibrating the flow sensor 100 prior to use, the microcontroller will be able to determine the airflow based on the flow sensor module 130 at a given temperature. In order to maintain low manufacturing costs for the flow sensor 100, a limited effective temperature range may be used. In one embodiment, the flow sensor 100 may be calibrated to provide an accurate airflow reading within a range of 5 degrees Celsius to 45 degrees Celsius. In such an embodiment, the microcontroller 110 will only accept a signal from the flow sensor module 110, in order to determine airflow, when the temperature module 120 has a reading within a range of 5 degrees Celsius to 45 degrees Celsius. This range is merely an example and not meant to limit the scope of the invention. Narrower or broader temperature ranges may be used without deviating from the scope of the invention. In one embodiment, the microcontroller 110 may only transmit a "flow is on" or "flow is off" signal. In such an embodiment, the actual airflow value is not recorded and transmitted, but rather a threshold minimum value is used. If the airflow is below the threshold value, or no airflow is detected, then a "flow is off" signal is transmitted. On the other hand, if the recorded airflow is greater than or equal to the threshold value, then a "flow is on" value is transmitted in order to, for example, control operation of the system in which the flow sensor 100 is in place. In one embodiment, the threshold airflow value is between 75 and 100 feet per minute. However, numerous threshold values or units of measure may be used without limiting the scope of the invention.

In yet another embodiment, the microcontroller 110 may record and return an actual airflow value to a monitor system (not shown) for various uses in monitoring the system in which the flow sensor 100 is in place. In yet another embodiment, the microcontroller 110 itself may use the actual airflow for various reports, instructions, and messages that could be used to control the system in which the flow sensor is in place 100. In one embodiment, actual airflow value may be used by an electrically enhanced filter to determine the power required by the enhanced filter system, such as increased power during higher airflows and reduced power during lower airflow. The use of a flow sensor in an electrically enhanced filter system is exemplary only and is not intended to limit the scope or use of the present invention. Those skilled in the art will be aware of many modifications and uses consistent with the present invention.

In another embodiment, the sensor circuit board 101 could include an ion sensor module 140. In one embodiment, the circuit board 101 may contain both the ion sensor module 140 and the flow sensor 130 and temperature sensor 120 modules. In another embodiment the ion sensor module 140 could be on its own circuit board. In one embodiment, the ion sensor module 140 may transmit a signal to the microcontroller 110 indicating the ionization level detected. In such an embodiment, the ion sensor module 140 could report the actual level of detected charge. This may be used to calibrate power into the system and determine if enough ions are being generated, or if too many ions are being generated, for current processing conditions. In another embodiment the microcontroller 110 could use the signal from the ion sensor module 140 to determine whether the level of detected charge is within acceptable limits. In yet another embodiment, the ion sensor module 140 itself may transmit a signal indicating whether the ion level is within acceptable limits or wither the ionization level is above acceptable limits. Such an embodiment may be used if the ion sensor is being implemented in order to determine if ions are precipitating into the wrong areas. In an electrically enhanced filter system, for example, such an embodiment of the ion sensor module 140 may be used to detect if ions are improperly precipitating downstream of the filter. Those skilled in the art will be aware of many modifications and uses consistent with the present invention.

Lastly, the sensor circuit board 101 includes a power switch module 150. The power switch module 150 may receive "turn on" and "turn off" requests from the microcontroller 110. If the power switch module 150 receives a "turn off" signal, then the switch cuts power to the apparatus utilizing the flow sensor 100 and/or ionization detector 100. If the power switch module 150 receives a "turn on" signal, then the switch returns power to the apparatus utilizing the flow sensor 100 and/or ionization detector 100.

Figure 3:
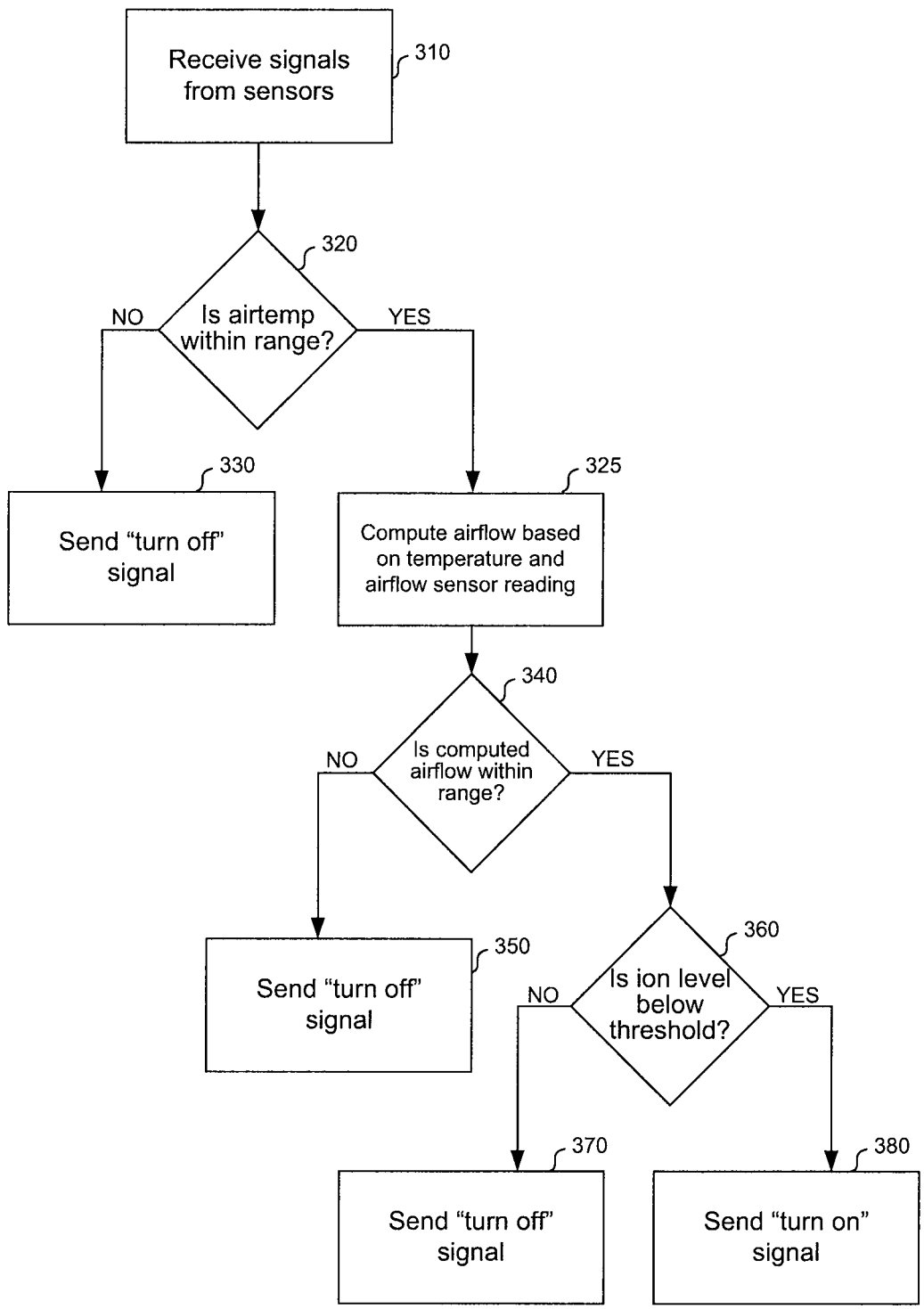
FIG. 3 is a flow diagram illustrating one embodiment of a microcontroller's processing steps for determining a signal to transmit to a power switch.

As stated above, the signals received by the microcontroller 110 are used for determining whether to transmit a "turn on" or "turn off" signal to the power switch 150. FIG. 3 is a flow diagram illustrating one embodiment of the microcontroller's processing steps for determining which signal to transmit to the power switch. At pre-determined time intervals, the microcontroller 110 receives signals (step 310) from the three sensor modules; temperature sensor module 120, flow sensor module 130 and ion sensor module 140. In one embodiment, the temperature sensor module 120 transmits an ambient air temperature value in Celsius, Fahrenheit or Kelvin. Upon receipt of the temperature value, the microcontroller 110 determines if the value is within an operating temperature range (step 320). In another embodiment, the temperature sensor module 120 transmits a signal from which temperature can be determined. In one embodiment, the operating temperature range is between 5 degrees Celsius and 45 degrees Celsius. If the received temperature value is outside of the operating range, then the microcontroller 110 transmits a "turn off" signal (step 330) to the power switch 150. However, if the received temperature value is within the operating range, then the microcontroller 110 makes another determination in regard to airflow.

In one embodiment, the flow sensor module 130 transmits a signal to the microcontroller 110. Based on the temperature from the temperature sensor module 120, the microcontroller uses the signal from the flow sensor module 130 to compute airflow (step 325). The microcontroller 110 determines whether the airflow is within an acceptable range (step 340). If the airflow is not in that range, then the microcontroller 110 transmits a "turn off" signal to the power switch 150 (step 350). In another embodiment, the microcontroller 110 senses whether the power switch 150 is allowing or denying power to an attached apparatus utilizing the flow sensor 100. If the power switch 150 is already denying power, then a "turn off" signal does not need to be transmitted. On the other hand, if the microcontroller 110 determines that airflow is within an acceptable range, then the microcontroller 110 makes another determination regarding ionization levels.

In one embodiment, the ion sensor module 140 transmits a value representative of the number of ions present in the airflow passing the flow sensor 100. Upon receipt of the ion value, the microcontroller 110 makes a determination whether the ion value is below a threshold ion value (step 360). If the received ion value is above the threshold, then the microcontroller 110 transmits a "turn off" signal (step 370) to the power switch 150. However, if the received ion value is below the threshold, then the microcontroller 110 transmits a "turn on" signal (step 380) to the power switch. In another embodiment, the microcontroller 110 senses whether the power switch 150 is allowing or denying power to the attached apparatus utilizing the flow sensor 100. If the power switch 150 is already allowing power, then a "turn on" signal does not need to be transmitted. The above steps for determining which signal the microcontroller 110 should transmit to the power switch 150 are merely examples. In another embodiment it may be preferential for determination of ion level (step 360) to be performed first, or performed separately from the temperature and airflow determination. Numerous flow processes may be used without limiting the scope of the invention.

Figure 4:
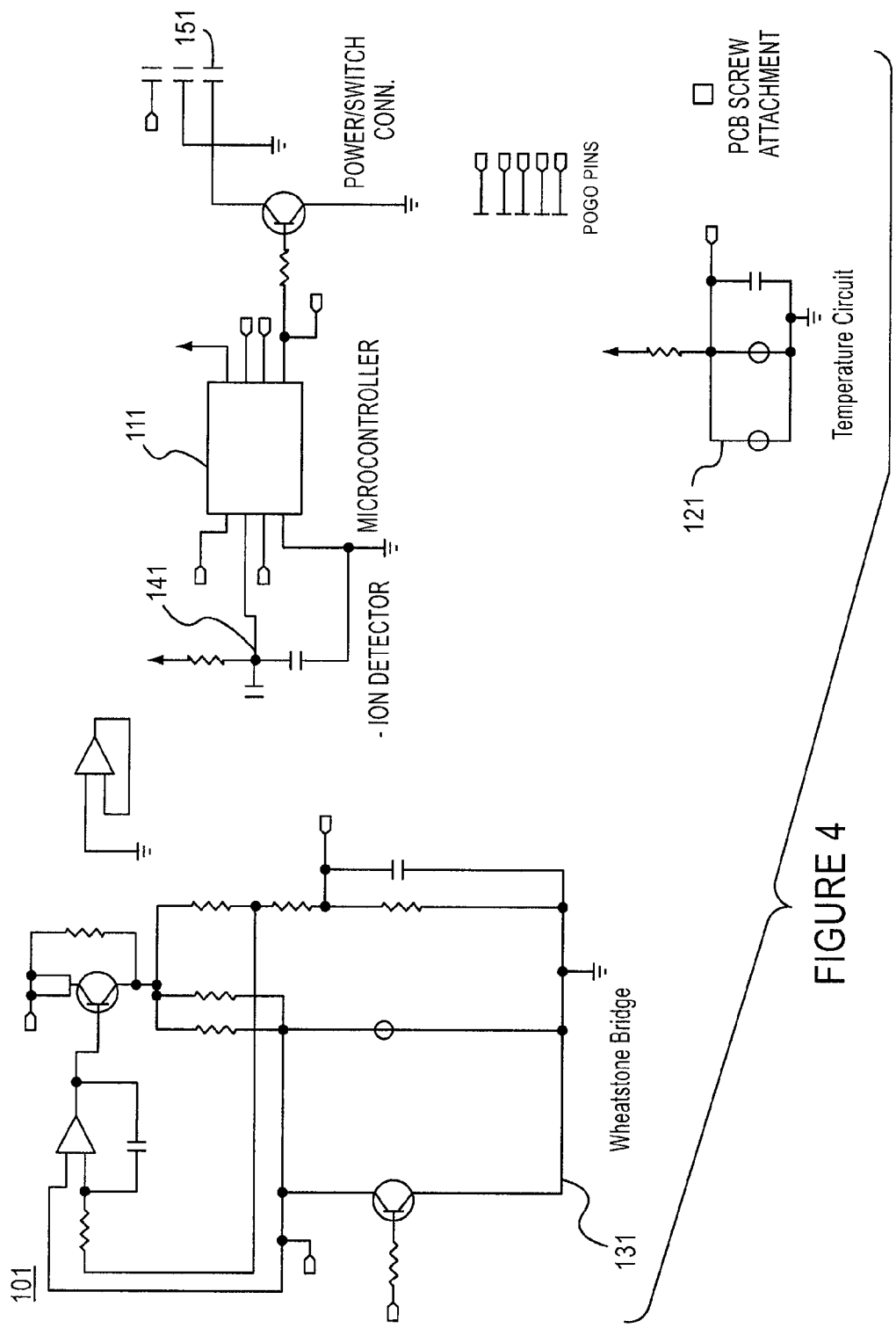
FIG. 4 is a circuit diagram illustrating one embodiment of a flow sensor circuit.

FIG. 4 is a circuit diagram illustrating one embodiment of a flow sensor circuit. As with FIG. 2, the circuit board 101 comprises; a microcontroller circuit 111, a temperature sensor circuit 121, a flow sensor circuit 131, an ion sensor circuit 141 and a power switch circuit 151.

In one embodiment, flow sensor circuit 131 is a resistance temperature detector (RTD). A RTD is any element that has a measurable electrical resistance that varies as a function of temperature. For example, an RTD could include a thermistor, also known as a thermal resistor, or a platinum resistor. A thermistor is a type of resistor used to measure temperature changes, relying on the change in its resistance with changing temperature. In yet another embodiment, the flow sensor circuit 131 comprises a Wheatstone Bridge. As a resistor receives current, its temperature increases. Thus, the more current running through the flow sensor circuit 131, the hotter the circuit 131 gets. When cooler air passes by the circuit 131, the circuit itself 131 may cool down, thus reducing its resistance. However, the flow sensor circuit 131 must be calibrated in order to determine what portion of the change in resistance of the flow sensor circuit 131 is due to a change in the air temperature passing by the circuit 131 and what portion is due to a change in velocity of the air.

In order to determine what portion of the change in resistance of the flow sensor circuit 131 is due to temperature change and what portion is due to airflow change, the temperature sensor circuit 121 is utilized. By using the temperature sensor circuit 121 to determine temperature, the resistance of the flow sensor circuit 131 can be used to determine airflow velocity based on a known resistance calibration within a certain temperature range For example, for any measurement temperature $T_M$ within an acceptable temperature range, $T_{Low}$ to $T_{High}$, the flow sensor circuit 131 will have a known resistance at various air velocities. Using the temperature sensor circuit 121 to determine $T_M$, will allow for the calculation of air velocity based on the resistance of the flow sensor circuit 131.

In one embodiment, the temperature sensor circuit 121 receives a low current flow, thus keeping the temperature sensor circuit's 121 temperature down. Hence, the circuit's 121 resistance is measured as a function of the ambient air temperature. Therefore, the combination of the temperature sensor circuit 121 and the flow sensor circuit 131 provide for accurate air flow readings within a pre-determined temperature range.

In one embodiment, both the flow sensor circuit 131 and the temperature sensor circuit 121 are set apart from the other circuitry included on the sensor circuit board 101. This alignment may prevent the flow circuit 131 and temperature circuit 121 from receiving false reading from any heat generated from the remaining circuits on the sensor circuit board 101. Further, as stated above, the top sensor housing 102 and the bottom sensor housing 103 have openings 104 and 105 aligned over the flow circuit 131 and temperature circuit 121. This permits fresh air to pass over the two circuits providing for accurate readings untainted by heat generated from the circuit board 101.

The opening 104 and 105 are also used to allow the ambient air, and the airflow of interest, to convectively cool at least a portion of the temperature sensor circuit 121 and flow sensor circuit 131. In one embodiment the portion being cooled can comprise an RTD. In this embodiment, the RTD(s) must be heated above the ambient air temperature, either through self-heating or through the use of a parallel heating element that can also be cooled by convection. Proper selection of an RTD in the present invention is made in relation to the expected fluid density, velocity range, and temperature range.

Referring again to FIG. 4 also shown is an ion circuit 141. The ion circuit 141 may comprise of an open electrode on the circuit board 100 to detect charge. In the embodiment in FIG. 4, the ion circuit comprises a parallel resistor-capacitor circuit that may be used to determine the charge on an ion collector. Those skilled in the art will be aware of alternative embodiments consistent with the present invention.

Figure 5:
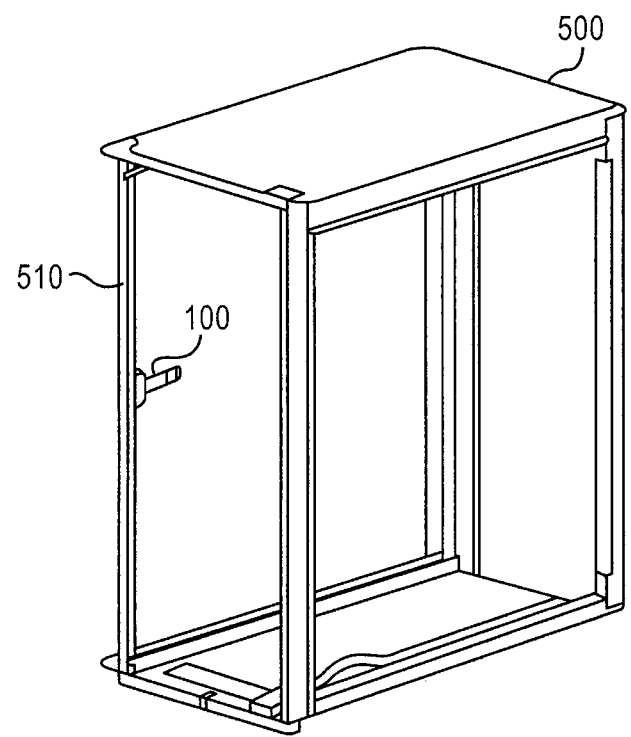
FIG. 5 is a diagram of an air filtration system including a flow sensor.

The applications where a low cost flow sensor may be utilized are numerous. In one embodiment, an air filtration system (hereinafter "AFS") may benefit from such a sensor. FIG. 5 is a diagram of one embodiment of the frame of an AFS. Air filtration system 500 comprises an outer frame 510. In this example, the interior components are not shown. In one embodiment, the AFS 500 is placed within HVAC ducting upstream from an HVAC system. When air reaches the AFS 500 electrostatic technology is used to filter airborne particles from the incoming air by producing negatively charged ions which attach themselves to the incoming air particles. Further upstream in the AFS 500 is a porous mechanical filter having positively charged strands throughout. As the negatively charged air particles pass into the filter, they are electrically attracted to the positively charged filter strands. Hence, the air particles become trapped in the filter. In one embodiment, the AFS 500 is turned on while the HVAC system is pushing air throughout the ducting. When the HVAC system stops flowing air, it is desirable for the AFS 500 to turn off as well.

A low cost flow sensor as described herein may be useful in assisting the AFS 500 in turning on and off in synchronization with air flow from the HVAC system. In one embodiment, the flow sensor 100 is placed upstream from the air flowing out of the AFS 500. The flow sensor 100 may be affixed to a portion of the exterior framing of the AFS 500. Such placement permits filtered air to pass across the flow sensor 100. The flow sensor 100 determines whether a threshold amount of airflow passes across its circuit 131. Further, the temperature sensor 120 senses the ambient air temperature of the incoming air. If the ambient air temperature is within the operating temperature range, then the value from the flow sensor 130 is used to determine if airflow based on the temperature. In one embodiment, the airflow may not actually be determined, but logical circuitry could be used to determine if the value from the flow sensor 130 is sufficiently high based on the temperature signal. Hence, if the threshold amount of air flow is found, the AFS 500 turns on. On the other hand, if the amount of airflow is below the threshold amount, the AFS 500 turns off. Further, if the ambient air temperature is outside of the operating temperature range, the value of the flow sensor 130 is ignored and the AFS 500 shuts down. In result, the AFS 500 is able to operate concurrently with the HVAC unit by utilizing a low cost air flow sensor operable in a fixed temperature range typical of the operating temperature range of an HVAC system.

There will also be many uses for an ionization detector 100 in an air filtration system (AFS) 500. For example, an ionization detector 100 may be placed downstream of a filter and affixed to a portion of the frame 510 so as to be able to detect of ions are precipitating downstream. This would allow the system to determine if the filter is not in place, not properly in place, or if the filter is damaged. In order to protect equipment downstream, including a flow sensor 100, the ionization detector 100 could be used to shut down the system if a certain threshold of ions are detected. In another embodiment the ionization detector could be affixed to the frame upstream of the frame 510 in order to detect the ionization level upstream of a filter element (not shown).

The use of the ionization detector 100 in an air filtration system 500 is not intended to limit the present invention. An ionization detector 100 consistent with the present invention may be used anywhere where detection of ions would be beneficial to control process conditions or protect ion sensitive equipment, devices, or systems. Those skilled in the art will be aware of many uses and modifications of an ionization detector consistent with the present invention.

Figure 6:
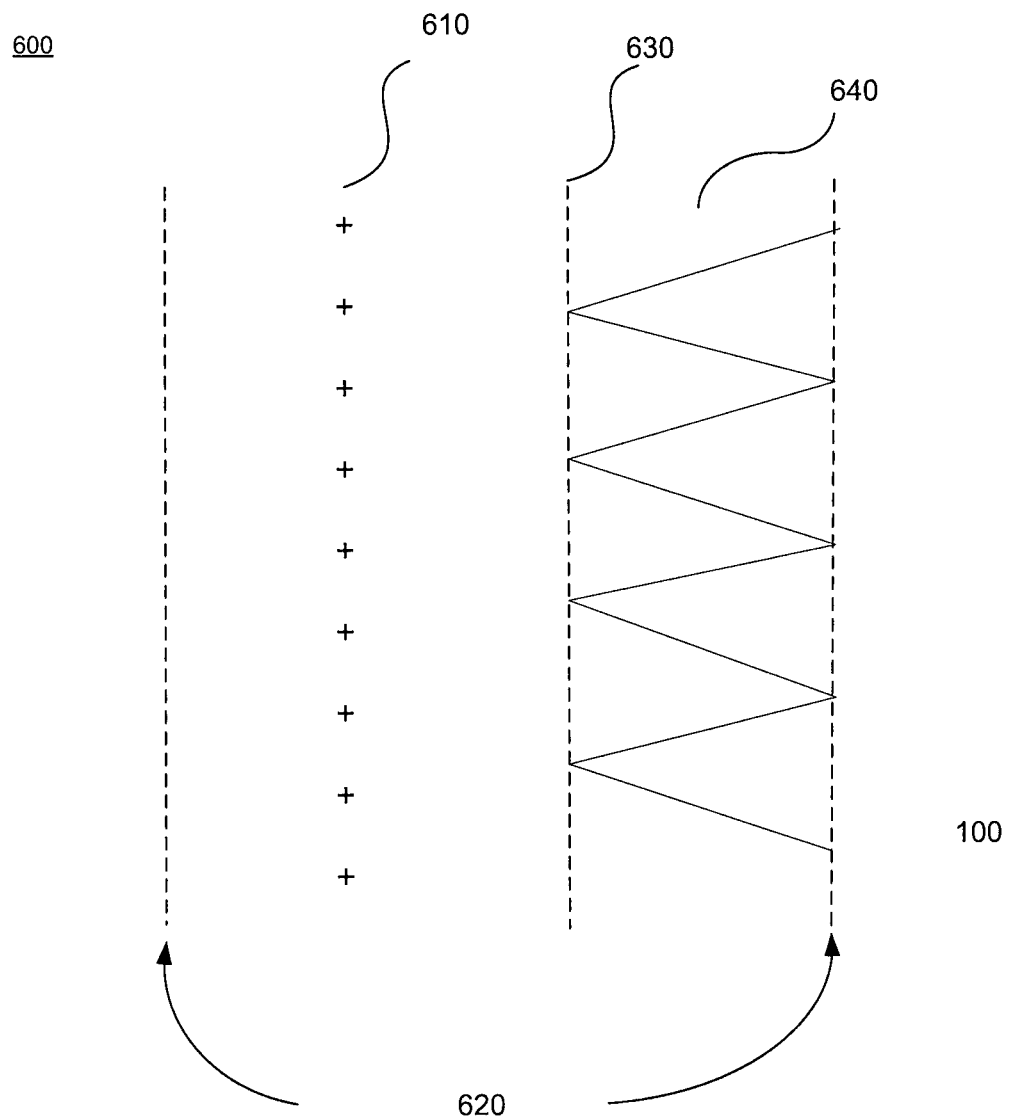
FIG. 6 is a system diagram illustrating one embodiment of a single filter electrically enhanced air filtration system.

FIG. 6 is a system diagram illustrating one embodiment of a single filter electrically enhanced air filtration system 600. This single filter electrically enhanced air filtration system comprises an ionizing electrode 610 located between an upstream and downstream ground screen 620 and the ionizing electrode 610 located upstream of a field electrode 630 and filter 640. In one embodiment the flow sensor 100 and/or ionization detector could be located downstream of the filter 640. At this location, ions generated at the ionizing electrode 610 should be captured by the filter 640. The flow sensor 100 and/or ionization detector 100 can be located in a position sufficient to measure airflow through the air filtration system 600, and to detect ions escaping downstream in order to protect against the operation of the ionizing electrode 610 in conditions of no flow or no filter. Those skilled in the art will be aware of modifications consistent with the present invention.

In conclusion, the present invention provides, among other things, a system and method for a low cost flow sensor. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A fluid flow sensor, comprising:
    a first resistance temperature detector configured for generating a flow signal, wherein the flow signal is based on a fluid velocity, and wherein the first resistance temperature detector is configured for a fluid temperature range, the fluid temperature range being pre-determined to exclude extreme temperatures;
    a second resistance temperature detector configured for generating a temperature signal, wherein the temperature signal is based on a fluid temperature; and
    a controller coupled to the first resistance temperature detector and the second resistance temperature detector, the controller configured for receiving the flow signal and the temperature signal, wherein the controller takes a first controller action when:
        the temperature signal is within a temperature signal range corresponding to the fluid temperature range; and
        the flow signal is within a flow signal range, wherein the flow signal range is determined based on the temperature signal.

2. The fluid flow sensor of claim 1, wherein the controller is configure to take a second controller action when:
    the temperature signal is outside a temperature signal range, or
    the flow is outside the flow signal range.

3. The fluid flow sensor of claim 1, wherein the first controller action comprises the controller placing the fluid sensor in one of two binary states.

4. The fluid flow sensor of claim 1, wherein the first controller action comprises the controller transmitting a first controller signal.

5. The fluid flow sensor of claim 4, wherein the controller is configured to compute the fluid flow velocity, wherein the fluid flow velocity is computed based on the flow signal and the temperature signal.

6. The fluid flow sensor of claim 5, wherein the first controller signal is the fluid flow velocity.

7. The fluid flow sensor of claim 1, further comprising:
    a flow housing positioned to surround at least a portion of the fluid flow sensor.

8. The fluid flow sensor of claim 1, wherein the first resistance temperature detector comprises at least one of a group comprising a thermistor and a platinum resistor.

9. The fluid flow sensor of claim 1, wherein the first resistance temperature detector is part of a Wheatstone Bridge circuit.

10. The fluid flow sensor of claim 1, wherein the controller is a microcontroller.

11. The fluid flow sensor of claim 7, wherein the fluid flow housing has an opening positioned over the first resistance temperature detector and the second resistance temperature detector.

12. The fluid flow sensor of claim 1, further comprising:
    a switch coupled to the controller, wherein the switch receives a control signal from the controller.

13. The fluid flow sensor of claim 1, wherein the first resistance temperature detector and the second resistance temperature detector are configured for use in air.

* * * * *